United States Patent [19]

Rigamonti et al.

[11] Patent Number: 5,547,750
[45] Date of Patent: Aug. 20, 1996

[54] NO DROP FILMS OR PLATES CONSISTING OF ACRYLIC POLYMERS AND PROCESS FOR THEIR PREPARATION

[75] Inventors: Marco Rigamonti, Milan; Franco Marciandi, Rho; Massimo Cesana, Milan, all of Italy

[73] Assignee: Atohaas Holding C.V., Netherlands

[21] Appl. No.: 337,054

[22] Filed: Nov. 10, 1994

[30] Foreign Application Priority Data

Nov. 10, 1993 [IT] Italy .................... MI93A2399

[51] Int. Cl.$^6$ .............. C08K 3/18; C09D 4/02; C09D 5/00; B32B 5/16
[52] U.S. Cl. ............ 428/329; 428/482; 428/331; 428/451; 428/516; 428/520
[58] Field of Search ................ 428/329, 483, 428/516, 520

[56] References Cited

U.S. PATENT DOCUMENTS

| | | | |
|---|---|---|---|
| 4,576,864 | 3/1986 | Krautter et al. | 428/328 |
| 5,104,732 | 4/1992 | Patel | 428/331 |
| 5,342,683 | 8/1994 | Rigamonti et al. | 428/331 |

FOREIGN PATENT DOCUMENTS 1309796  11/1992  Canada.
0374516  6/1990  European Pat. Off..
0399441  11/1990  European Pat. Off..
0571808  12/1993  European Pat. Off..

*Primary Examiner*—Kriellion S. Morgan
*Attorney, Agent, or Firm*—Bryan Cave LLP

[57] ABSTRACT

The invention concerns films or plates of acrylic polymers, in particular polymethylmethacrylate, that have no drop properties. The films or plates are coated with a monomeric composition, polymerized and reticulated by ultraviolet light, consisting of:

a) from 50 to 70% by weight of acrylic or methacrylic esters of $C_2$–$C_{18}$ aliphatic glycols or of (poly)alkylenoxides formed by 1 to 6 of $C_2$–$C_4$ alkyleneoxide units;

b) from 10 to 30% by weight of $C_2$–$C_4$ hydroxyalkyl acrylate or methacrylate;

c) from 10 to 30% by weight of acrylic or methacrylic acid or their derivatives;

d) from 1 to 10% by weight of a reticulation agent consisting of a polyfunctional acrylic monomer containing at least three double bonds, the components of class a) excluded the sum of Components (a)–(d) being 100%, and;

e) from 0.01 to 3 parts by weight for 100 parts by weight of a+b+c+d of hydrophilic colloidal metal oxides and;

f) from 0 to 0.06% parts for 100 parts by weight of a+b+c+d of a U.V. polymerization initiator.

15 Claims, No Drawings

NO DROP FILMS OR PLATES CONSISTING OF ACRYLIC POLYMERS AND PROCESS FOR THEIR PREPARATION

The present invention relates to no drop and antifogging products, in particular films and plates, comprising a support consisting of acrylic polymers and a polymerized and U.V. light crosslinked coating, consisting of a mixture of particular acrylic monomers and of small amounts of hydrophilic metal oxides.

It is known that one of the problems faced in the use of generally transparent plates, based on thermoplastic polymers such as polymethylmethacrylate is the surface condensation of water in the form of small or large drops which reduce the transparence thereof. The prior art has suggested various surface treatments of said plates in order to solve this problem. The prior art treatments fail to give long-lasting no-drop characteristics, or involve complicated and polluting processes or, in the case of acrylic plates, gives undesirable yellowish coloring.

It is known from DE patent 3,400,079 to treat plates of acrylic polymers, in particular polymethylmethacrylate (PMMA), by effecting a first surface coating with a layer of polymers unsoluble in water having a modest content of polar groups, applied by solutions or dispersions thereof, which in its turn is coated with a colloidal silica layer or colloidal metal oxides insoluble in water, applied through spraying of solutions or dispersions thereof.

This process is complex and expensive because it involves the application of two subsequent layers, it can cause pollution due to the use of solvents and often it does not allow the achievement of good adhesions of the layers applied to the polymeric plate. European patent application EP 374,516, describes the coating of transparent plates of thermoplastic polymers, in particular of polycarbonate, with a solution formed by at least 92% by weight of organic solvents and 8% of a mixture consisting of:

a) a curable polyfunctional acrylic monomer, in particular 1,6-hexandiol diacrylate, b) colloidal metal oxides, in particular silica, and c) a U.V. crosslinking catalyst, generally in amounts from 1 to 10% by weight, in which the ratio by weight b/a varies from 1.9 to 19, and said solution is successively cured by U.V. light forming a crosslinked coating containing from 65 to 95% by weight of colloidal metal oxides.

This process has disadvantages, because it employs high amounts of metal oxides, which in order to be dispersed, require high amounts of polluting and toxic solvents which can cause the thermoplastic plate to become opaque. In addition, it requires large amounts of a crosslinking catalyst and ultraviolet rays, which can cause undesirable yellowing of to the polymeric plates.

European patent application EP 317,410 describes the treatment of polymethylmethacrylate plates (PMMA) with a mixture of acrylic monomers, comprising at least 40% by weight of acrylic or methacrylic acid, at least from 0.1% to 5% by weight of a U.V. polymerization initiator, and successively polymerizing the layer of applied monomers with U.V. light.

Such a treatment causes a certain yellowing of the PMMA plates due to the employment of considerable amounts of U.V. initiators. Large amounts of U.V. initiators are used for the considerable amounts of (meth)acrylic acid, which usually contains remarkable amounts of inhibitors. Moreover, the use of considerable amounts of said acrylic acids, which are volatile and irritating, presents toxic and polluting problems.

In our U.S. Pat. No. 5,342,683, no drop coatings are described, obtained from mixtures of acrylic monomers which avoid the inconveniences of the prior art.

In our further research, we have now developed improved coatings by employing other acrylic monomeric mixtures that have superior haze and transmittance characteristics.

We have developed a simple and non-polluting process to give no drop and antifogging properties to the surface of films, plates and formed articles in general, based on acrylic polymers, in particular PMMA, which does not have the drawbacks of the known processes. Our process consists of coating the surface of the formed articles with a mixture of particular acrylic monomers containing small amounts of hydrophilic colloidal metal oxides and polymerizing and crosslinking in situ said mixture at U.V. light.

The process can be carried out only in a continuous phase integrated with the preparation of the formed article. Our process does not require organic solvents and, normally, U.V. polymerization initiators are not employed or only in limited amounts lower than 0.06%.

The formed articles obtained in accordance with our invention have excellent no drop and antifogging properties, good surface hardness, negligible or, very low yellowing indexes, good antistatic properties and in the case of transparent articles they substantially maintain their transparency.

Moreover, because the so applied no drop layer has a high adhesion to the surface of the formed article, it is stable, resistant to abrasion and to washing away and maintains its characteristics over time.

An object of the present invention are products such as films, plates and formed articles with no drop and antifogging characteristics comprising a support consisting of acrylic polymers and a coating having the following composition:

a) from 50% to 70% by weight of acrylic or methacrylic esters of $C_2$–$C_{18}$ aliphatic glycols or of (poly)alkylenoxides formed by 1 to 6 of $C_2$–$C_4$ alkylenoxide units;

b) from 10 to 30% by weight monomers of formula:

$$CH_2=C-COOR^2 \quad\quad (I)$$
$$|$$
$$R$$

or their oligomers in which: R is H or $CH_3$; $R^2$ is a $C_2$–$C_6$ hydroxyalkyl or an ethoxylic group $-(CH_2-CH_2O)_n-H$ where n is a whole number from 1 to 10;

c) from 10 to 30%, preferably from 15 to 20% by weight of acrylic or methacrylic acid or of acrylic or methacrylic monomers containing a group of formula:

$$-CH=C-CO- \quad\quad (II)$$
$$|$$
$$R$$

or preferably their dimers, or their derivatives, optionally and preferably partially salified, preferably up to 10%, preferably with ammonia, metal ions or ammonium, in which R has the meaning stated above;

d) from 1 to 10% of a crosslinking agent consisting of one or more acrylic or methacrylic esters of a polyfunctional alcohol, having at least three double bonds, the components of class (a) excluded;

e) from 0.01 to 3 parts by weight per 100 parts of a+b+c+d, preferably 0.05–1 parts, more preferably 0.1–0.5 parts by weight of hydrophilic colloidal metal oxides;

f) from 0 to 0.06 parts by weight per 100 parts of a+b+c+d of a U.V. polymerization initiator, the sum of a) +b) +c) +d) being 100, and in which said coating has been polymerized and crosslinked through U.V. rays.

It is preferable to use the polymerization starter f) in a higher amount if components a, b, c, optionally also d, contain inhibitors which are commonly employed in commercial products, generally in amounts of about 100–200 ppm to counter the effect of the inhibitor.

UV light absorbers in amounts from 0 to 4 parts for 100 parts of mixture can also be used in the mixture of the invention, as it is well known in the art.

In this case the amount of f) must be preferably in an amount similar to the amount of the UV absorber.

This gives the coating a higher resistance to atmospheric ageing.

In the case in which the compound f) is higher than 0.06 parts, it can cause discoloring of the plates as noted above.

The Applicant has unexpectedly found that it is possible to eliminate this discoloring by filtering the UV radiation to eliminate most of the light having a wave length lower than 300 nm.

This is accomplished, for example, with a Pyrex filter.

To prevent excessive adverse effects on the polymerization kinetics, it has been found that the polymerization can be carried out in nitrogen flow, preferably in air flow enriched with nitrogen.

As acrylic polymers forming the support, there may be employed polymers and copolymers, generally transparent, of esters of acrylic or methacrylic acid, preferably polymethylmethacrylate (PMMA) or its transparent alloys with e.g. polyvinylchloride (PVC) and polyvinylidene fluoride (PVdF).

As the monomer of component a) it is preferable to employ hexanediol dimethacrylate (HDDA), tripropylene glycol di(meth)acrylate (TPGDA), ethylene glycol di(meth)acrylate (EGDM), tetraethylene glycol di(meth)acrylate (TEGDM).

As monomers of component (b), hydroxyethyl- and hydro-xypropyl-acrylates or -methacrylates can be employed, preferably alpha-hydroxyethyl(meth)acrylate.

As compounds for component c) there can be employed, e.g., acrylic acid, methacrylic acid, β-carboxyethylacrylic acid and zinc, ammonium or sodium diacrylate.

As reticulation agents, e.g., pentaerythritol triacrylate (PETIA), dimethylol propane triacrylate, dipentaerythritol pentacrylate, pentaerythritol tetracrylate, can be employed.

As crosslinking agents urethanes and poly(meth)acrylates can be used, for example an aliphatic urethane hexa(meth)acrylate, urethane tri(meth)acrylate, obtained by reaction of glycols+isocyanates+hydroxyethyl(meth)acrylate.

As hydrophilic colloidal metal oxides, there can be employed, e.g., hydrophilic colloidal silica, obtained by precipitation such as TYXOSY L38® of Rhône-Poulenc or by combustion such as HDK N20® of Wacker, as well as aluminium hydroxide. Preferably colloidal silica are employed.

If it is useful to employ small amounts of a U.V. polymerization initiator, it is preferably based on benzophenone such as ESACURE KT 37® in combination with UVECRYL P115® of Fratelli Lamberti, or Irgacure 500® of CIBA-GEIGY. Darocur 1173® and the other compounds indicated in the above mentioned EP Patent 374,516 can also be utilized.

The process for making no drop and antifogging products consisting of films, plates and formed articles of acrylic polymers, consists in applying on the surface of said products a homogeneous layer of the monomeric composition having the previously indicated composition as a)+b)+c)+d)+e)+f) and then submitting the so coated product to a ultraviolet radiation in order to polymerize and crosslink said coating layer.

Due to its simplicity and versatility the process can be continuously carried out in an industrial plant integrated with the preparation or the formed product of support, in particular with the manufacture by filming or extrusion of acrylic films and acrylic plates.

More particularly the process can be industrially carried out in line by directly and continuously applying the monomeric mixture on extruded plates, for example PMMA plates, in particular double-walled, as they come out from an extrusion die and continuously submitting the so coated plates to a radiation of U.V. lamps, with the further advantage that the evaporation of the monomers forming the applied mixture is thus reduced to a minimum.

The viscosity of the mixture forming the coating can be adjusted through variation of the monomers, polymers and silica amounts, and can be applied with any of the coating method industrially employed such as, e.g., spraying or spreading so as to form a homogeneous layer.

The plate surface is preferably quite clean and smooth to avoid dishomogeneity during the polymerization phase.

The thickness of the applied monomeric layer can vary from about 0.5 µm to 30 µm.

Normally it is not necessary to employ U.V. polymerization initiators, however in case of thicknesses of the monomeric layer higher than 15 µm it is preferable to employ small amounts of such initiators to have a quicker polymerization and reticulation in the layer depth.

Thicknesses between 10 and 15µm are already sufficient to obtain, according to the present invention, U.V. polymerized coatings having good adhesion, resistant to washing away and the desired no drop and antifogging properties.

The polymerization and crosslinking of the monomeric layer are carried out by exposure to U.V. radiation. It is unnecessary to operate in anaerobic atmosphere, however, for relatively long exposure times to U.V. rays, it is advisable to operate in nitrogen atmosphere in order to avoid the inhibition due to oxygen.

Obviously the polymerization rate and therefore the exposure times to U.V. rays can vary within wide limits depending on various factors, such as for example the kind of utilized monomers, the type and the power of the utilized U.V. lamp, the thickness of the monomeric coating and its distance from the lamp, the viscosity of the monomeric mixture, the support temperature, etc.

By operating, however, according to the present invention, and in absence of U.V. initiators, it is possible to employ very short irradiation times from a few seconds to about 15 minutes, according to the power of the U.V. lamps. It is preferable to use high power U.V. lamps.

To ascertain the effectiveness of the present invention in conferring both no drop and anti-fogging properties, tests on PMMA plates samples, coated according to the process at the present invention, and on comparative plates samples, have been carried out.

For carrying out the test a thermostatic bath has been utilized with water at 50° C. above which the coated plates have been placed inclined of 18°–23°, with the coated surface in contact with the vapour, placed side by side with the comparative uncoated ones.

In the antifogging evaluation the time necessary for a visual disappearance of the fogging of the coated plate was measured.

The plates were maintained over the thermostatic bath for at least 15 days in order to evaluate whether the coating adhered and whether the no drop and antifogging properties remain unvaried over that time.

In the no drop test the amount of condensed water which by flowing collects at the bottom of each inclined plate, was measured within a period of 24 hours.

At the end of the tests both the haze and the plate final transmittances have been measured.

Some illustrative examples follow.

EXAMPLE 1

A solution containing the monomers 1,6 hexanediol diacrylate (HDDA, 55% by weight of the monomeric solution), 2-hydroxyethylacrylate (HEA, 25%), βcarboxyethylacrylate (βCEA, 12%) and pentaerythritol triacrylate (PETIA, 8%) to which colloidal silica (HDK T30-Wacker, 1 hps) is added and photoinitiator UV (DAROCURE 1173, CIBA-GEIGY) 1 part for 100 parts by weight of monomeric solution, after previous mixing, is laid out for a thickness of 10 μm on a PMMA plate and cured under a medium pressure UV lamp (lamp power=125 W/cm; lamp distance from the films to be cured 150 mm for a time lower than 10 seconds.

The plate has been tested over thermostatic bath with water at 50° C, with external room temperature and showed antifogging properties after three months. The antifogging properties are not immediate and generally the plate does not fog or slightly fogs, over thermostatic bath, after 3 or 4 days.

The water condensate, gauged in 24 hours, is about three times that of an uncoated polymethylmethacrylate plate when the temperature difference between the thermostatic bath and the atmospheric room is at least 20° C.

After one month the haze was 2.5% and the transmittance 91% (ASTM D1003) in comparison with an initial value of 0.7% and 92.1%, respectively. The yellowing index remained unaltered (ASTM D1925).

EXAMPLE 2

The formulation containing the monomers of Example 1, with addition of colloidal silica (HDK T30) 1 part per 100 parts of monomeric solution (phs), UV photoinitiator (DAROCURE 1173, 2 phs) and UV adsorbers (TINUVIN 1130 CIBA-GEIGY, 1 phs and TINUVIN 292 CIBA-GEIGY, 1 phs) is laid out on a PMMA plate and cured under the same conditions as in example 1.

The antifogging and anti-mist properties are similar to that of example 1, even though the coated plate yellowing index is slightly higher.

The coated plate has been exposed to the QUV/B test and it has shown no crazes after 3000 hours of exposure. After 1000 hours of exposure to the QUV/B, the yellowing index was the same as the one of the exposed plate, for the same period of time of Example 1.

EXAMPLE 3

The formulation of example 2 is laid (10 μm thickness) on a PMMA plate and cured under a Philips HPK 125 lamp (about 25 W/cm), lamp distance 10 mm from the film for about 5 minutes in the presence of nitrogen flow and with a Pyrex glass plate (having a thickness of 2 mm) between the lamp and coated plate. The obtained plate shows the same antifogging and anticondensate properties as in the previous example, but it shows a better yellowing index.

EXAMPLE 4

A solution containing the monomers: tripropylene glycoldiacrylate (TPGDA) 50% of the monomeric solution, 2 hydroxyethylmethacrylate (HEMA, 20%), IRR® 189 (20%) (mixture of dimers of the acrylic acid, marketed by UCB) and trimethylolpropanetriacrylate (TMPTA, 10%), to which colloidal silica (HDK T40, Wacker) is added 2 phs (parts for 100 parts by weight of solution) and UV photoinitiator (DAROCURE 1173) 2 phs, is laid on a PMMA plate and cured as in Example 1. More photoinitiator was added due to the greater inhibition of TPGDA from the atmospheric oxygen, with respect to HDDA. The superficial properties of the coating are similar to those of Example 1.

EXAMPLE 5

A solution containing the monomers HDDA (55% by weight of the monomeric solution), HEMA (25%), zinc diacrylate (3%), βCEA (10%) and dipentaerythritol pentacrylate (DPEPA, 7%) to which colloidal silica (HDKT 30, 1 phs) is added, is heated for about 1 hour at 40° C. under stirring.

After such a time, UV photoinitiator (IRGACURE 184-CIBA, 1 phs) is added and dissolved in said solution, at room temperature by stirring for about 1 hour. The so prepared mixture is laid (10μ of thickness) on a PMMA plate and cured with the same procedure as in Example 1.

After one day, one obtains an initial antifogging effect, quicker than the one obtained in Example 1.

EXAMPLE 6 (Comparative)

A PMMA plate has been coated by spreading with a layer of 15 μm of a mixture containing 55% by weight of methylmethacrylate, (in the form of syrup containing about 13 parts of PMMA and 87 of monomer), 20% by weight of alpha hydroxyethyl methacrylate (HEMA), 18% by weight of acrylic acid (AA), 6.98% of the crosslinking agent pentaerythritol triacrylate (PETIA) and 0.02% by weight of colloidal silica. Philips lamps HPK 125 (about 25 W/cm) have been applied, by keeping the plate at 20 cm from the lamps and for a period of 10 minutes.

The plate has been tested over thermostatic bath with water at 50° C., with external room temperature and has shown antifogging properties even after one month.

The water condensate, gauged in 24 hours, is about three times that of an uncoated polymethylmethacrylate plate.

After one month the haze was 7% and the transmittance 89%, in comparison with an initial value of 1% and 92% respectively.

We claim:

1. Films, plates and formed articles having no drop and antifogging characteristics, said articles films and plates comprising an acrylic support having a crosslinked, U.V. polymerized coating, said coating comprising the following components:

a) from 50% to 70% by weight of acrylic or methacrylic esters of $C_2$-$C_{18}$, aliphatic glycols or of (poly)alkylenoxides formed by 1 to 6 $C_2$-$C_4$ alkylenoxide units;

b) from 10 to 30% by weight of monomers of formula:

or of their oligomers, wherein R is H or $CH_3$; $R^2$ is a $C_2$-$C_6$ hydroxyalkyl or an ethoxylic group —$(CH_2$—$CH_2O)_n$—H where n is a whole number from 1 to 10;

c) from 10 to 30% by weight of acrylic or methacrylic acid or of acrylic or methacrylic monomers containing a group of formula:

or their dimers or derivatives, in which R has the above-defined meaning;

d) from 1 to 10% of a crosslinking agent consisting of one or more acrylic or methacrylic esters of a polyfunctional alcohol, having at least three double bonds, the components of class (a) being excluded, the sum of components a, b, c and d being 100%;

e) from 0.01 to 3 parts by weight per 100 parts of a+b+c+d, of hydrophilic colloidal metal oxides; and f) from 0 to 0.06 parts by weight per 100 parts of a+b+c+d of a U.V. polymerization initiator.

2. Films, plates and formed articles according to claim 1, in which the acrylic polymers of the support are polymers or copolymers of esters of acrylic or methacrylic acid.

3. Products according to claim 1, in which the support consists of polymethylmethacrylate.

4. Films, plates and formed articles according claim 1, in which the monomers of component b) are hydroxyethyl or hydroxypropylacrylates or -methacrylates.

5. Films, plates and formed articles according to claim 1, in which the monomers of c) are acrylic or methacrylic acid, β-carboxyethylacrylic acid or zinc or ammonium diacrylate.

6. Films, plates and formed articles according to claim 1, in which the crosslinking agent is pentaerythritol triacrylate, dimethylolpropane triacrylate, dipentaerythritol pentacrylate or pentaerythrite tetracrylate.

7. Films, plates and formed articles according to claim 1, in which the colloidal metal oxides are colloidal silica or colloidal aluminium hydroxide.

8. Products according to claim 1, in which the monomer of component a) is selected from the group consisting of hexanediol diacrylate, tripropylene glycol diacrylate, ethylene glycol dimethacrylate, and tetraethylene glycol di(meth)acrylate.

9. Products according to claim 1 wherein the amount of component (c) is from 15 to 20% by weight.

10. Products according to claim 1, wherein the dimers or derivatives of component (c) are partially salified.

11. Products according to claim 10, wherein the dimers or derivatives of component (c) are salified up to 10% with ammonia, metal or ammonium ions.

12. Products according to claim 1, wherein component (e) is present in amounts from 0.05–1 parts by weight per 100 parts of a+b+c+d.

13. Products according to claim 1, wherein component (e) is present in amounts from 0.1–0.5 parts by weight per 100 parts of a+b+c+d.

14. Products according to claim 1, wherein the monomers of component (b) are α-hydroxyethyl (meth)acrylate.

15. A process for preparing a film, plate or formed article having no drop and antifogging characteristics, said process comprising:

(a) applying a homogeneous coating layer of a composition comprising components (a), (b), (c), (d), (e) and (f) of claim 10 to the surface of an acrylic film, plate or formed article to form a coated support; and (b) treating the coated support with ultraviolet irradiation to polymerize and cross-link the homogeneous coating layer.

* * * * *

UNITED STATES PATENT AND TRADEMARK OFFICE
CERTIFICATE OF CORRECTION

PATENT NO. : 5,547,750
DATED : August 20, 1996
INVENTOR(S) : Marco Rigamonti et al.

It is certified that error appears in the above-indentified patent and that said Letters Patent is hereby corrected as shown below:

Column 6 Line 59: Delete "$C_2 - C_{18},$" Insert --$C_2 - C_{18}$--

Column 7 Line 24: Delete "Products" Insert --Films, plates and formed articles--

Column 8 Line 4: Delete "Products" Insert --Films, plates and formed articles--

Column 8 Line 9: Delete "Products" Insert --Films, plates and formed articles--

Column 8 Line 11: Delete "Products" Insert --Films, plates and formed articles--

Column 8 Line 13: Delete "Products" Insert --Films, plates and formed articles--

Column 8 Line 16: Delete "Products" Insert --Films, plates and formed articles--

Column 8 Line 19: Delete "Products" Insert --Films, plates and formed articles--

Column 8 Line 22: Delete "Products" Insert --Films, plates and formed articles--

UNITED STATES PATENT AND TRADEMARK OFFICE
CERTIFICATE OF CORRECTION

PATENT NO. : 5,547,750

DATED : August 20, 1996

INVENTOR(S) : Marco Rigamonti et al.

It is certified that error appears in the above-indentified patent and that said Letters Patent is hereby corrected as shown below:

Column 8 Line 29:  Delete "10"           Insert --1--

Signed and Sealed this

Fifth Day of November, 1996

BRUCE LEHMAN

Attest:

Attesting Officer

Commissioner of Patents and Trademarks